United States Patent [19]

Eicher et al.

[11] Patent Number: 5,556,149
[45] Date of Patent: Sep. 17, 1996

[54] GRIPPER DEVICE

[75] Inventors: Fred C. Eicher, Prospect; Charles F. Evans, Jr.; Charles F. Evans, III, both of Louisville, all of Ky.

[73] Assignee: Turn-Act, Inc., Louisville, Ky.

[21] Appl. No.: 274,421

[22] Filed: Jul. 13, 1994

[51] Int. Cl.⁶ ........................................................ B66C 1/10
[52] U.S. Cl. ............................................. 294/104; 901/36
[58] Field of Search ...................... 294/88, 103.1, 294/104, 106, 113; 414/732, 740; 901/27, 36

[56] References Cited

U.S. PATENT DOCUMENTS 3,610,676  10/1971  Richner ..................................... 294/116
4,982,988  1/1991  Murphy ..................................... 294/104

FOREIGN PATENT DOCUMENTS 570079   3/1993  Japan ....................................... 294/104
1093548  5/1984  U.S.S.R. ................................... 294/104

Primary Examiner—Dean Kramer
Attorney, Agent, or Firm—Wheat, Camoriano, Smith & Beres, PLC

[57] ABSTRACT

A rotary clamping device includes a rotary actuator and an L-shaped base, with a gripper device mounted on the output shaft of the rotary actuator. The construction is very simple and lightweight, so that, in the preferred embodiment, it is made up primarily of four extruded parts in addition to the actuator.

7 Claims, 3 Drawing Sheets

5,556,149

GRIPPER DEVICE

BACKGROUND OF INVENTION

The present invention relates in general to gripping devices and more particularly relates to gripping devices where an arm is rotated from a first position to a second position to close on an object.

In many applications such operations are used in association with materials handling functions where the gripper is carried by a transporting mechanism and closes on a part to hold the part while the transport mechanism moves it from one work station to another.

Numerous gripper devices are known in the art to provide for rotation of an arm from a closed position to a release position. In prior art applications where large forces are required the gripping force is achieved by extension and retraction of a shaft of a piston cylinder connected to a translational device to convert the linear motion to rotational.

While such devices are satisfactory for some applications they have significant shortcomings for many applications.

In many cases the assemblies are heavy so the inertia of the device greatly increases the force required to move the gripper from one location to another.

Additionally, because of the excessive weight and bulk prior art assemblies are generally ergonomically and economically unacceptable.

Fabrication of the prior art units where linear motion is translated to rotary have typically required casting and machine work as well as other operations which have been labor intensive and expensive. Further multiple parts have been required to convert the linear motion to rotary and these parts are subject to wear failure.

No prior art devices are known which provide the advantages or unexpected results of devices within the scope of the present invention.

SUMMARY OF THE INVENTION

The present invention provides new and useful rotary gripping devices particularly useful in material transfer applications where materials or parts are picked up by the gripper on an arm which is then rotated to a new location for further operations on the part.

Devices within the scope of the present invention are lightweight and can advantageously be made of light material such as aluminum. More particularly, devices within the scope of the present invention can use a rotary actuator where linear actuators were required by prior art devices. Accordingly devices within the scope of the present invention are more compact than prior art devices and because of the lower weight and compact design have lower inertia and require less force and effort.

One important feature is that devices within the scope of the present invention are easily and inexpensively fabricated. More importantly, devices within the scope of the present invention can be fabricated from inexpensive extruded components which reduce cost and allows standardization of parts which is difficult to achieve in prior art devices. Additionally, it has been found that extruded parts provide superior wear and strength characteristics.

Briefly, the present invention provides gripper actuator arrangements to selectively operate a rotary gripping device including a generally "L" shaped base having first and second legs at right angles and adapted to hold a rotary actuator device having an output shaft rotatable between first and second positions where the actuator is connected to at least one of the legs so the shaft rotates about an axis parallel to the longitudinal axis of the base. An endplate is connected over one end of the base to the legs and has an aperture to receive the shaft. A clamp arm is connected to the shaft for rotation thereby from first position to second position by rotation of the shaft.

Examples of arrangements within the scope of the present invention are illustrated in the accompanying drawings and described hereinafter but it will be understood that neither the illustration presented herein nor the descriptions thereof are by way of limitation and that other arrangements also within the scope of the present invention will occur to those skilled in the art upon reading the following disclosure.

BRIEF DESCRIPTION OF THE DRAWINGS

Referring now to the accompanying drawings which illustrate one example of a device within the scope of the present invention.

DETAILED DESCRIPTION OF THE DRAWINGS

Figure 1A:
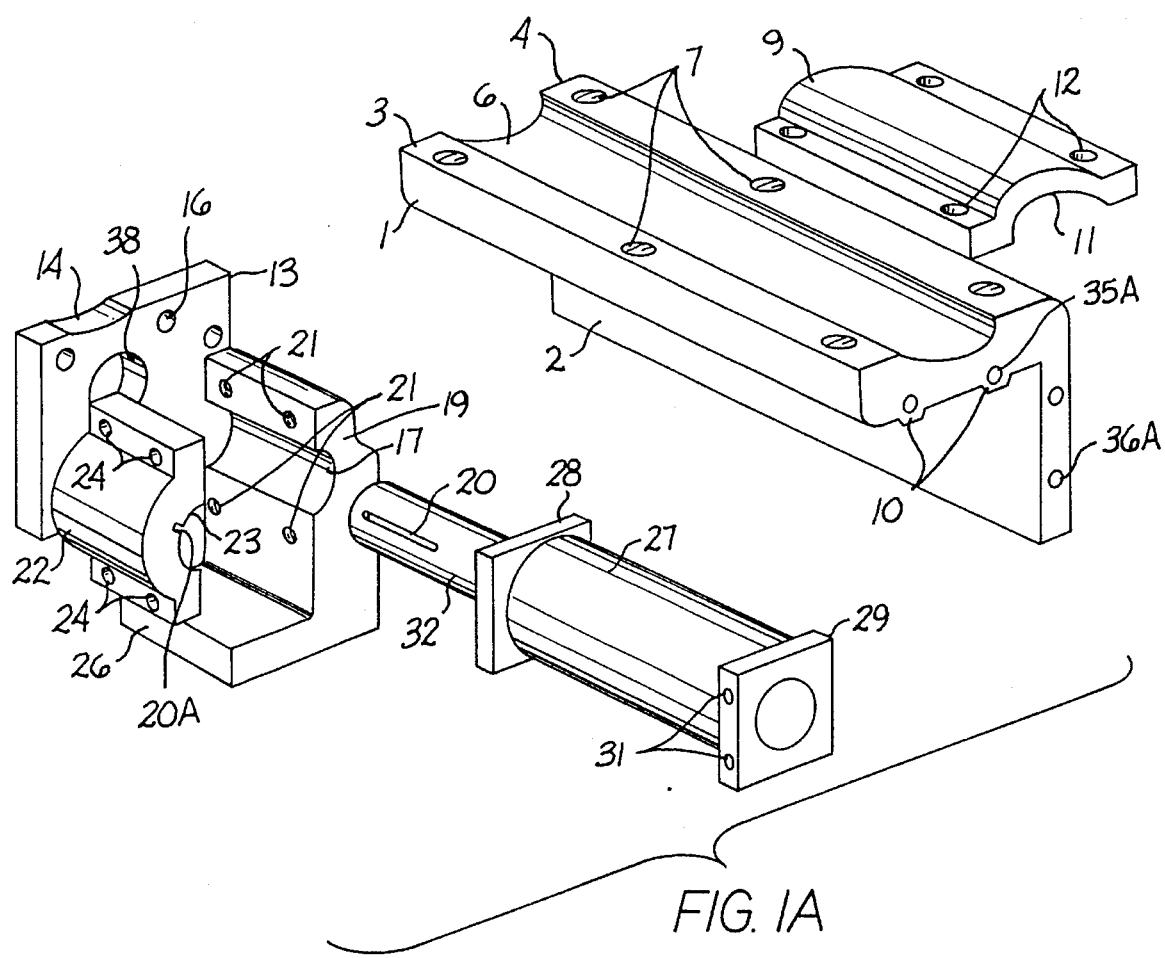
FIG. 1A is an exploded perspective view of an example of an arrangement within the scope of the present invention showing the elements of the device assembled to operate the clamping arm in one direction.

FIG. 1 illustrates the principal elements of an example of a device within the scope of the present invention and includes a generally "L" shaped base 1. Base 1 has a planar leg 2 and a second leg with an outer surface which includes matching surfaces 3 and 4 with a recess 6 therebetween to receive a shaft 25 (shown in FIG. 3) of a device(not shown) to move the assembly as described hereinafter with reference to FIG. 3.

Surfaces 3 and 4 are provided with cooperative drilled holes 7 which can be tapped to receive bolts (not shown) to be aligned with holes 12 of a clamp plate 9 so the bolts secure the clamp plate to the surfaces 3 and 4. The clamp plate 9 has a cooperative recess 11 which matches recess 6 so that the shaft 25 shown in FIG. 3 can carry the assembly described herein.

As shown three sets of mounting holes can be provided in the surfaces 3 and 4, in mutually aligned relation, so that the clamp plate 9 can be attached at selected locations as needed for particular applications.

Specifically, clamp plate 9 can be mounted at either end of base 1 to receive shaft 25 to allow for stability while gripping and transporting the load.

It is very important to note that both base 1 and clamping plate 9 can be produced by extrusion rather than fabrication as a casting or weldment. This significantly reduces the expense of the device and the inertia produced which is important in high speed manufacturing operations.

Detents 10 can be provided on the inner surface of the upper leg to provide space for drilled and tapped holes to hold endplate 13 on the base and to support a rotary actuator as described hereinafter.

Endplate 13 is provided as shown having holes 16 to attach the endplate to the base member 1 along both legs of the base member by means of drilled and tapped holes 35 and 36 as shown. A hole 38 is located in endplate 13 in aligned relation with the output shaft 32 of a rotary actuator 27 to provide journaling for the free end of the shaft which carries the clamping member as described hereinafter. Also, a groove 14 is provided in endplate 13 to allow location of the shaft 25 if needed to extend from the end of the clamping device next to endplate 13.

Rotary actuator 27 is provided and can be a vane actuator as is known in the art which can be pneumatic or hydraulic and has first and second heads 28, 29 defining fluid inlet/outlets 31 for introduction and emission of motive fluid. Within the scope of the present invention an electric actuator could also be used.

The actuator has an output shaft 32 which carries the gripping arm described hereinafter and rotates through a selected arc, e.g. 90 degrees, depending on the particular application.

The gripping arm can be composed of a clamp plate 22 and a clamp leg 19. plate 22 can have a keyway 20A to allow a key to be used to secure the shaft 32 of actuator 27 to the clamp plate by means of a cooperative groove 20 in the shaft to orient the gripper assembly.

Element 19 can be generally "L" shaped with a recess 17 on its inner surface to receive shaft 32 of actuator 27 and has drilled holes 21 which can be tapped to receive bolts 42 (FIG. 3) to hold the mating parts together around shaft 32. Grip foot 26 provides a base for a gripper jaw 51 shown in FIG. 2 of the type known in the art to hold the material to be transported. Jaw 51 is attached to the outer surface of the grip foot, for example by means of bolts 41A received in drilled and tapped holes 41 in the grip foot.

Figure 2:
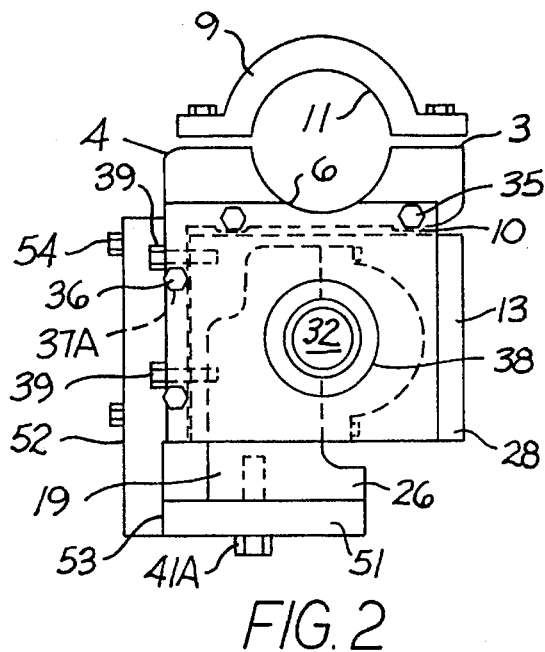
FIG. 2 is an end elevational view of the example of an apparatus within the scope of the present invention shown in FIG. 1 in assembled form.

Referring to FIG. 2, a stationary jaw 52 is provided and can be attached to leg 2 of base 1, for example by means of bolts 54 to define the gripping area 53 between the jaws 51 and 52.

Again, the elements 19 and 22 are designed so that they can be extruded rather than fabricated.

Figure 1B:
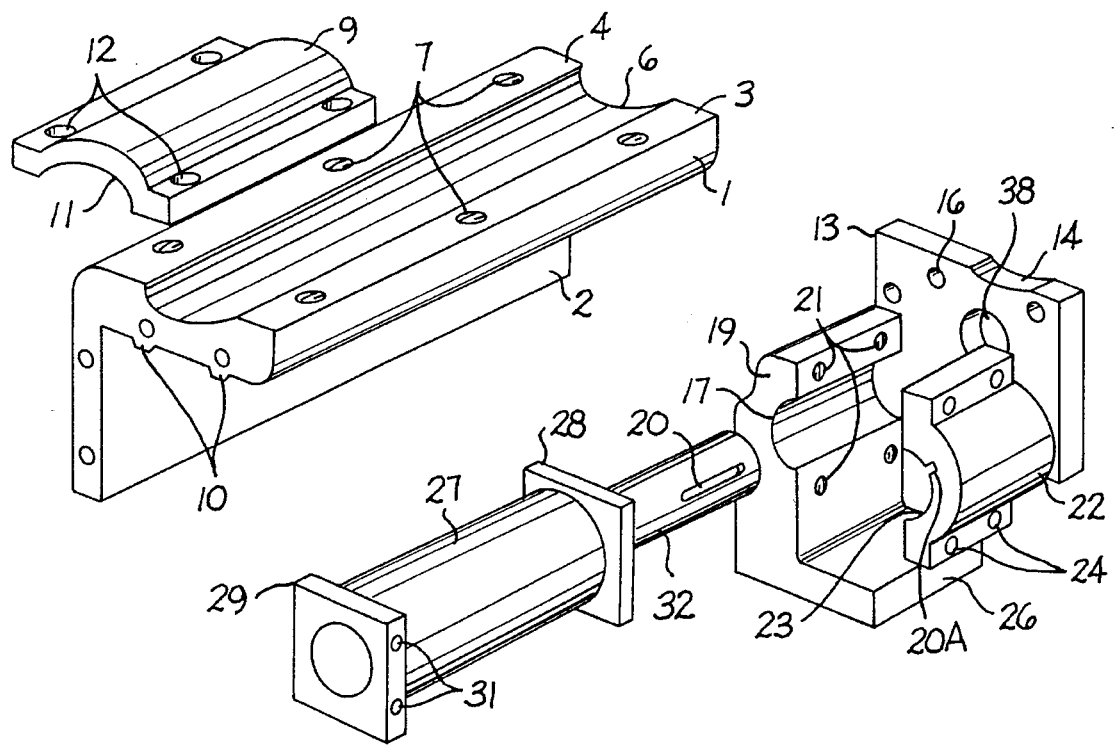
FIG. 1B is an exploded perspective view of an example of an arrangement within the scope of the present invention showing the elements of the device assembled to operate the clamping arm in an opposite direction to that shown in FIG. 1A.

FIG. 1B illustrates the same elements as shown in FIG. 1A assembled to allow grip rotation in a direction opposite the rotation in FIG. 1A.

FIG. 2 shows the elements in assembled relation with clamp plate 9 in alignment with surfaces 3 and 4. Also, bolts 39 are shown extending through the vertical leg of base 1 and connected to cooperative drilled and tapped holes in the sides of heads 28 and 29 of actuator 27 to hold the actuator to the base.

Figure 3:
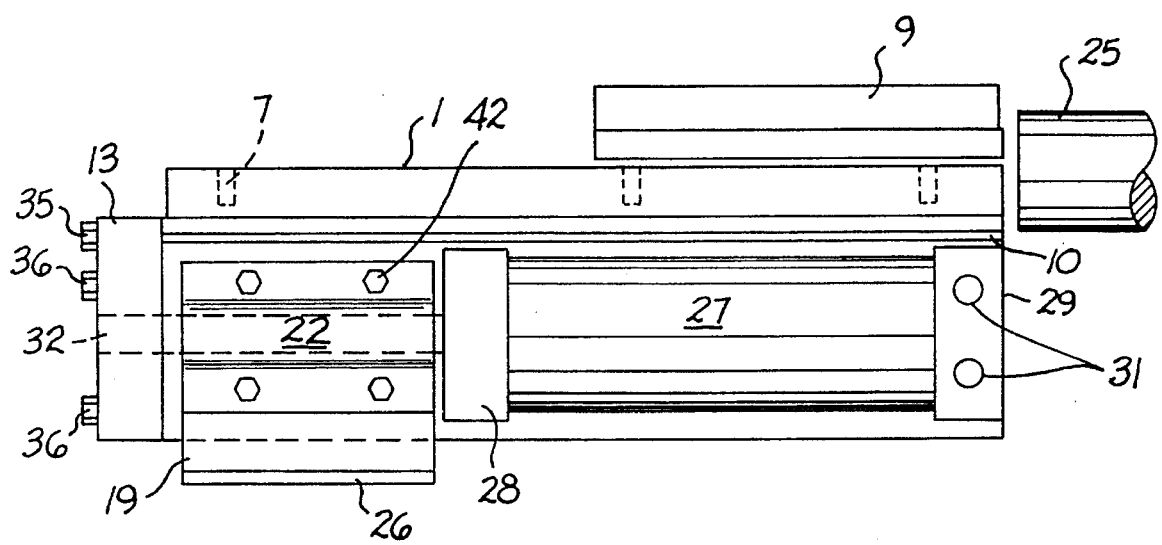
FIG. 3 is a side elevational view of the example of an apparatus within the scope of the present invention shown in FIG. 1 in assembled form.

As shown in FIGS. 2 and 3 bolts 35 and 36 are provided to secure endplate 13 to base 1.

Figure 4:
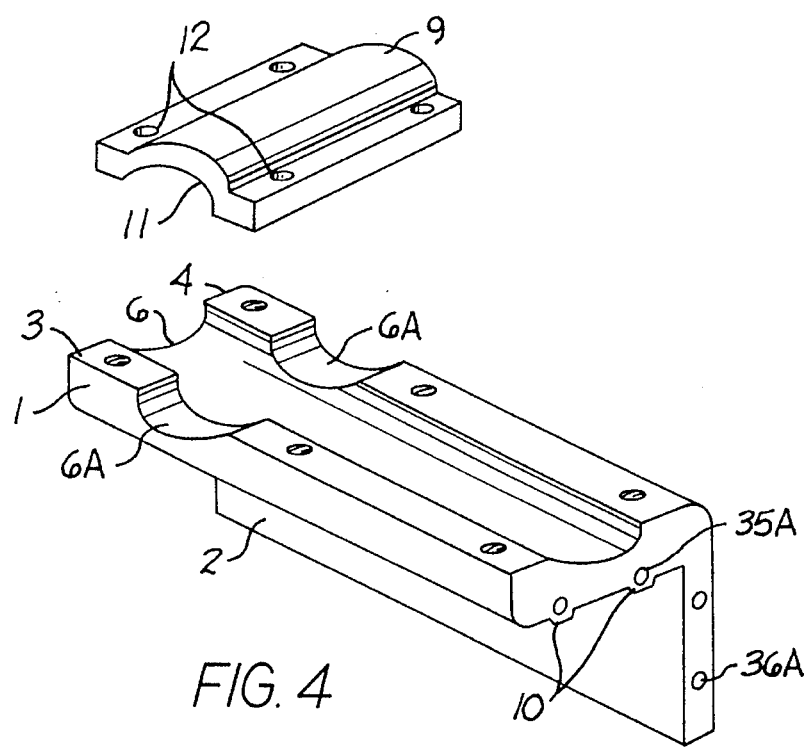
FIG. 4 is an illustration of another variation of devices within the scope of the present invention.

FIG. 4 illustrates yet another variation in devices within the scope of the present invention which allows attachment to a shaft (not shown) extending transverse to the longitudinal axis of the device. In the example of FIG. 4 a transverse groove 6A is cut in the base 1 as shown and the clamp 9 is rotated 90 degrees to be attached to the base as shown to hold the shaft.

It will be understood that the foregoing is but one example of an arrangement within the scope of the present invention and that other arrangements also within the scope of the present invention will occur to those skilled in the art upon reading the disclosure set forth hereinbefore.

The invention claimed is:

1. A rotary clamping device for mounting on a support arm, comprising:

a rotary actuator, including first and second heads and a rotary output shaft extending through one of said heads, said output shaft having a free end;

an L-shaped base including first and second legs, each of said legs having an inner surface and an outer surface, wherein said rotary actuator is mounted on said base adjacent to the inner surfaces of said legs, and wherein the outer surface of said second leg defines a first elongated recess;

an elongated clamp plate defining a second elongated recess and removably fastened to the outer surface of said second leg opposite said first elongated recess for connecting said base to a support arm;

an end plate mounted on said base and supporting the free end of said output shaft; and a gripping arm mounted on said rotary output shaft for rotation with said rotary output shaft.

2. A rotary clamping device as recited in claim 1, wherein said gripping arm comprises:

a generally L-shaped member, including a clamp leg and a grip foot at substantially right angles to each other, said clamp leg and grip foot each defining an inner surface and an outer surface, wherein said clamp leg defines a recess on its inner surface; and a gripping arm clamp plate, having inner and outer surfaces, and defining a recess on its inner surface which is aligned with the recess on the inner surface of the clamp leg;

wherein said gripping arm clamp plate and said clamp leg are releasably fastened together, with said output shaft lying in the aligned recesses on the clamp leg and the gripping arm clamp plate.

3. A rotary clamping device as recited in claim 2, wherein one of said recesses on said gripping arm defines a keyway and said output shaft carries a key which fits in said keyway to ensure that said gripping arm rotates with said output shaft.

4. A rotary clamping device as recited in claim 2, wherein said L-shaped member and said gripping arm clamp plate of said gripping arm are two extruded pieces.

5. A rotary clamping device as recited in claim 1, wherein said L-shaped base is a one-piece, extruded part, and said elongated clamping plate is a one-piece, extruded part.

6. A rotary clamping device as recited in claim 1, wherein said rotary actuator is a rotary vane actuator.

7. A rotary clamping device, comprising:

a rotary vane actuator having top, bottom, left and right sides and first and second heads, and including a rotary output shaft projecting through one of said heads, said shaft having a free end;

a one-piece, L-shaped base having inner and outer surfaces, said L-shaped base being mounted on said rotary vane actuator so that the inner surfaces of said base enclose two of said sides, wherein said L-shaped base defines a first recess in its outer surface;

a clamp plate removably mounted on said L-shaped base adjacent to said first recess;

an end plate mounted on said L-shaped base so as to support the free end of said shaft; and a gripper arm mounted on said shaft between said actuator and said end plate.

* * * * *